United States Patent [19]

Hagberg

[11] 4,095,912
[45] Jun. 20, 1978

[54] BEAM CONNECTION PLATE

[76] Inventor: Charles A. Hagberg, 732 N. Midvale Blvd., Madison, Wis. 53705

[21] Appl. No.: 789,288

[22] Filed: Apr. 20, 1977

[51] Int. Cl.² .............................................. F16B 7/00
[52] U.S. Cl. ................................... 403/187; 403/262; 52/726
[58] Field of Search .............. 403/262, 230, 187, 189, 403/13, 14; 52/726

[56] References Cited

U.S. PATENT DOCUMENTS

| | | | |
|---|---|---|---|
| 655,358 | 8/1900 | Smyth | 403/189 |
| 1,662,766 | 3/1928 | Wait | 403/230 |
| 2,019,684 | 11/1935 | Leake | 403/230 |
| 3,901,611 | 8/1975 | Simonsen | 403/187 |
| 3,977,801 | 8/1976 | Murphy | 403/189 |

Primary Examiner—Andrew V. Kundrat
Attorney, Agent, or Firm—Victor J. Evans & Co.

[57] ABSTRACT

A beam connection plate such as would be used to join steel beams to columns or to other structural beams as used in buildings, bridges, and the like. The connection plate consists of a straight steel plate with a groove down its middle and a solid backing. Along both edges there is a close spaced plurality of holes punched or drilled through the plate at even distances. The connecting plate is cut so that it fits along the vertical portion of an I beam, and this portion is stuck inside the groove of the plate. Welding is then done to fasten the vertical portion of the I beam to the connection plate. The punched or drilled holes are used to bolt the connection plate to another beam or column.

3 Claims, 10 Drawing Figures

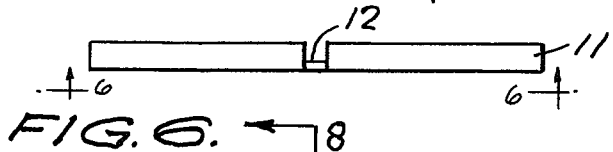
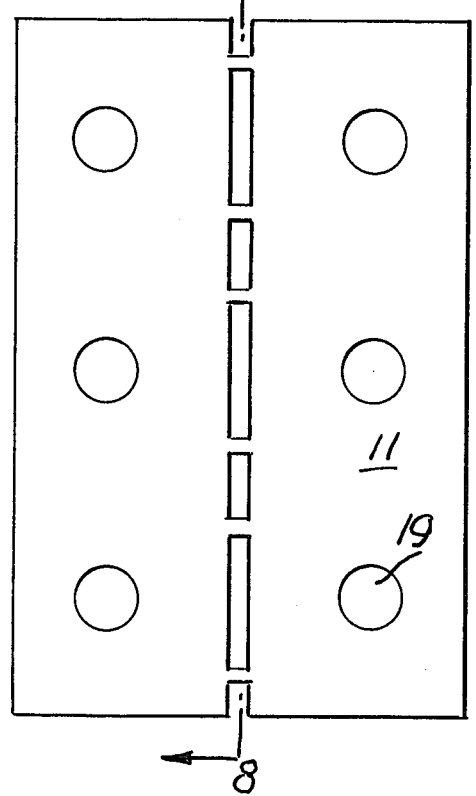
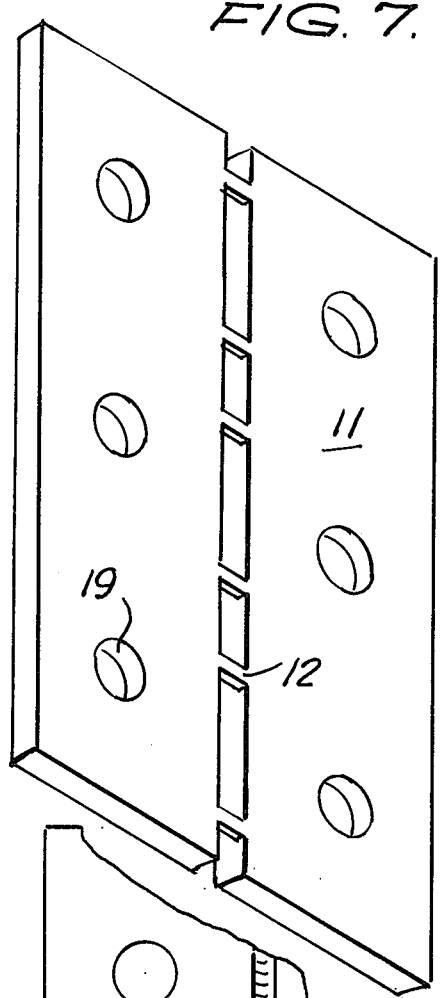
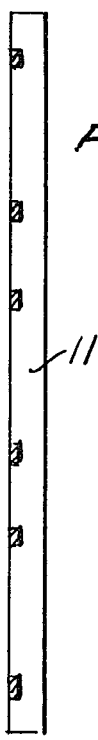
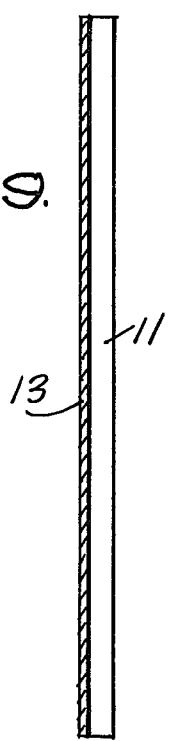
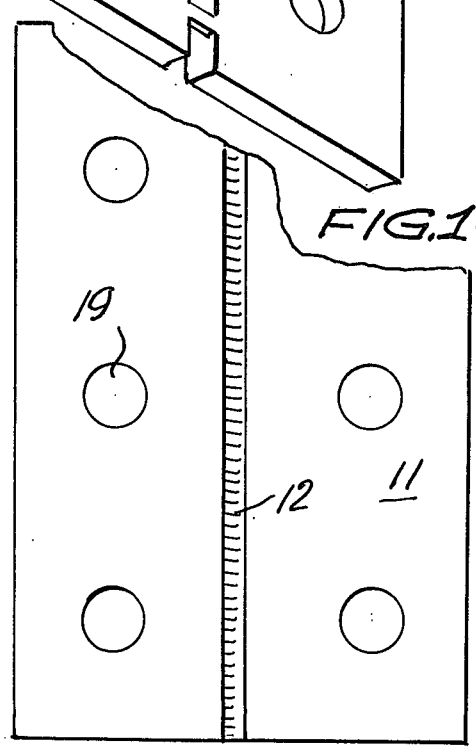

BEAM CONNECTION PLATE

BACKGROUND OF THE INVENTION

Up to the present time structural members have been connected together by means of two pieces of angle iron; one welded to each side of the beam. These angles frequently protruded past the end of the beam, and adjustment had to be made for the end of the beam being out of square. The beams were usually cut off to length, with a large friction saw and could be made up to ⅛ inch out of square on the ends, also this connection plate requires far less weld material because there are no outstanding leg of a clip angle to weld to the beam. The plate connection places all welds close to the connected beam and reduces eccentricities which could cause failure. A new invention to help fasten beams easier and to correct far out of square ends was most urgently needed.

FIELD OF THE INVENTION

The present invention relates to a beam connector plate for fastening structural beams together.

SUMMARY OF THE INVENTION

The present invention of a connector plate for structural beams includes a flat, reasonably narrow, steel plate with a groove cut down its middle and a solid plate as a backing. Between the groove and the two edges of the plate there is a string of evenly spaced punched or drilled holes through the plate, the length of the connector plate being employed depending upon the vertical dimension of the I beams being joined. The plate is fitted with the groove over the end edge of the beam and when the plate is square, it is welded along its length to the I beam. Bolts are inserted through the drilled holes in abutting connector plates to thereby join the beams together.

The primary object of the invention is to provide a beam connection plate which is used to easily and securely fasten structural members to each other, and at the same time to keep the beams and joints square with one another.

Other objects and advantages will become apparent in the following specification when considered in light of the attached drawings.

BRIEF DESCRIPTION OF THE DRAWINGS

FIG. 5 shows an end elevation view of a modified connector plate;

FIG. 6 is the plan view of a connector plate with a modification of the central groove taken along lines 6—6 of FIG. 5;

FIG. 7 is the perspective view of the plate with a modified groove;

FIG. 8 is a view taken along the line 8—8 of FIG. 6, looking in the direction of the arrows;

FIG. 9 is a side elevation of a plate and showing the solid backing plate; and

FIG. 10 is a cut away plan view of a connection plate with a groove down its middle.

Referring now to the drawings in detail, wherein like reference characters indicate like parts throughout the several figures, the reference numeral 10 indicates generally a beam connector plate incorporating the invention.

Figure 1:
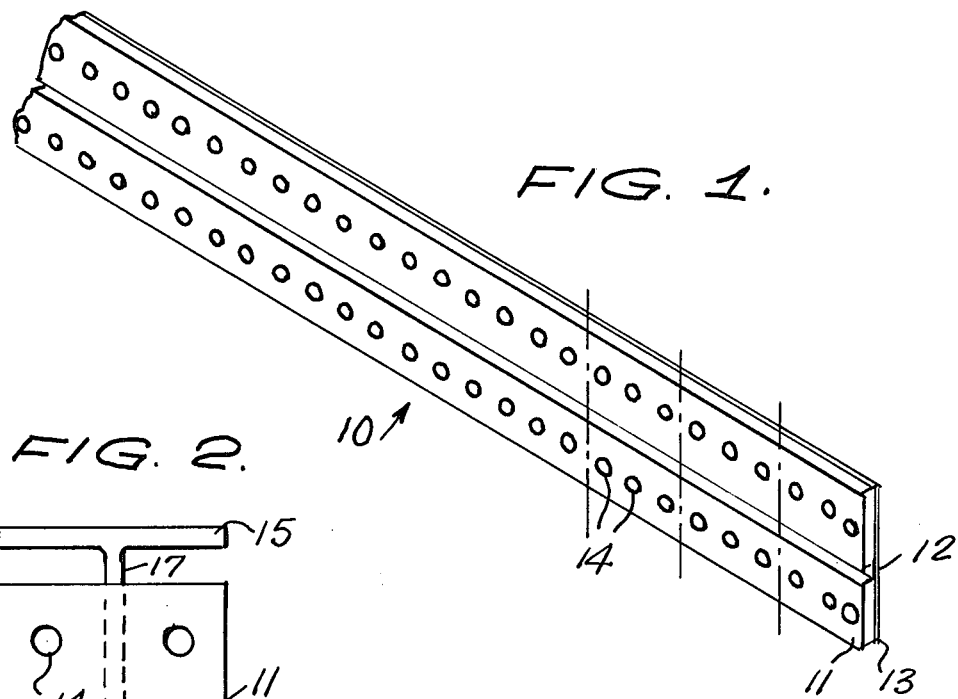
FIG. 1 is a perspective view of the connector plate showing the central groove and rows of drilled holes.

Connector plate 10 comprises a sheet of steel 11 which may be in the order of ½ inch thick, and having down its center line a groove 12 in the order of ¼ inch wide and essentially the depth of the sheet 11 thickness.

So as not to have two, separated, strips there is a thin backing plate 13 either spot welded or glued to the back of the thicker sheet 11, to keep groove 12 from being open at its bottom.

Along the entire length of sheet 11, and through its thicker portions, there are a plurality of evenly spaced holes 14, that also penetrate the backing plate 13, so that connecting bolts may pass through to fasten structure to be attached together.

Figure 2:
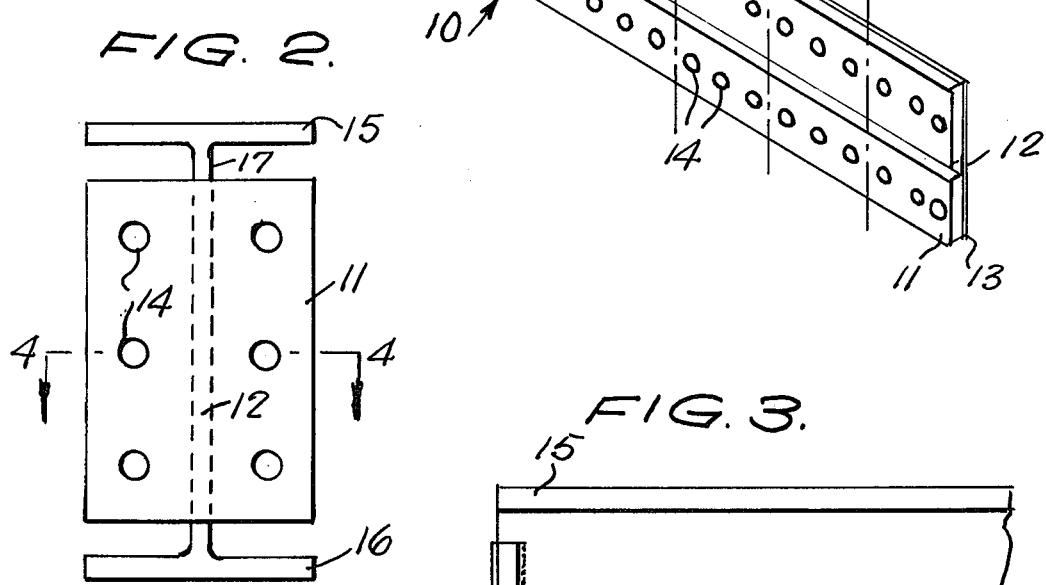
FIG. 2 is an end elevation view of an I beam with a connector plate in position.

A length of connecting palte 11 is cut according to the size of the I beam being joined, and it probably contains about three holes on each side of the groove 12, as in FIG. 2. This I beam, as usual, has horizontal arms 15 and 16, connected by a vertical portion 17 joining them.

When a section of connecting plate 11 is to be attached to the I beam, vertical portion 17 is placed in groove 12, and after the plate is angled slightly to be square across the end, then the parts are welded together by means of a welding seam 18, running the length of plate 11 and on both sides of the vertical. Thus, this welding securely fastens together the two components. Since the weld is extremely close to the center of gravity of the connected pieces it has very little eccentricity.

Figure 3:
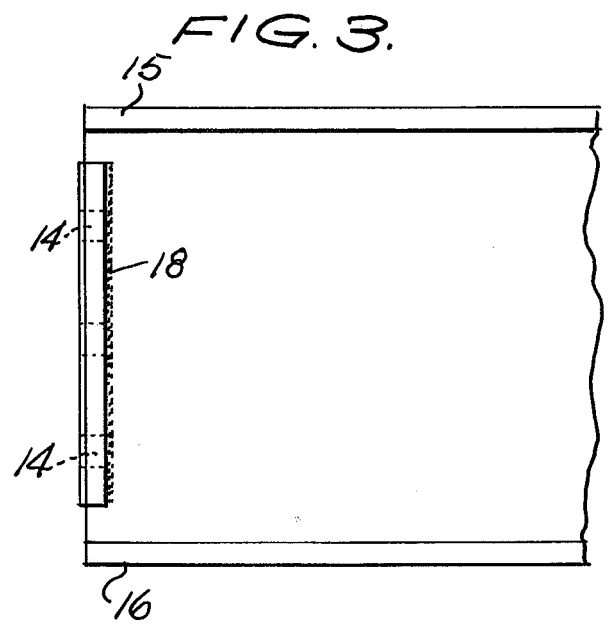
FIG. 3 is a side elevation view of an I beam showing the connector plate welded in place.
Figure 4:
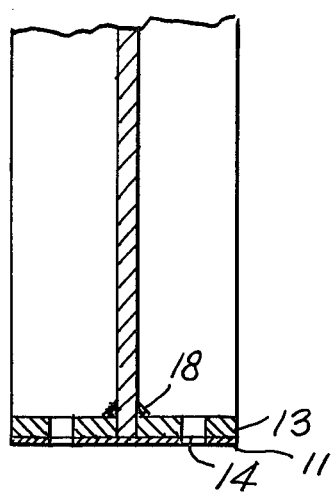
FIG. 4 is a view taken along the line 4—4 of FIG. 2, looking in the direction of the arrows.

In the slight modification of the connecting plate (FIGS. 6 and 7) the groove 12 is not made as a single, unobstructed groove, but instead has some cut and some uncut sections. This configuration will allow mechanical punch forming of the plate and can be fastened to the I beam the same way as shown in FIGS. 2 through 4, but with the backplate being optional.

In the use and operation of the invention there is a lengthy sheet of sheet steel connecting plate 11, which has a groove 12 cut down through the broad side of it and almost to the bottom, while across the back side of sheet 11 and covering the groove 12, there is fastened a backing sheet 13. A piece of connecting sheet is cut to fit between the horizontal arms 15 and 16 of an I beam, and vertical portion 17 of the beam is placed in groove 12. After this a welding bead 18 is located along 17 and plate 11 to firmly attach the two of them together. This being done there are several holes 14 along the side of the connecting plate and between arms 15 and 16 for the insertion of connecting bolts between pieces.

Having thus described the preferred embodiments of the invention it should be understood that numerous structural modifications and adaptations may be resorted to without departing from the spirit of the invention.

What is claimed is:

1. A beam connection plate for joining structural members comprising a sheet steel plate, an indentation along the center line of the plate, a thin backing plate attached over the steel plate, and a plurality of evenly spaced holes along the sides of the steel plate wherein the connection plate is cut to fit between the horizontal arms of an I beam and wherein the vertical arm of the I beam is placed within the indentation, and a welding bead is laid between the vertical arm and the connection plate.

2. The device of claim 1 wherein connecting bolts are inserted through the holes in mating steel plates to be joined.

3. The device of claim 2 wherein the indentation along the center line of the plate may have alternate cut out and uncut out sections.

* * * * *